US011939052B2

United States Patent
Van Der Meer et al.

(10) Patent No.: US 11,939,052 B2
(45) Date of Patent: Mar. 26, 2024

(54) AIRCRAFT ENGINE COMPRISING A VARIABLE AREA EXHAUST NOZZLE

(71) Applicant: Lilium eAircraft GmbH, Wessling (DE)

(72) Inventors: Pieter Laurens Van Der Meer, Munich (DE); Petr Cvach, Gilching (DE); Javier Sainz De La Maza, Germering (DE); Kilian Brath, Munich (DE); Sébastien Vermeiren, Munich (DE)

(73) Assignee: Lilium eAircraft GmbH, Wessling (DE)

( * ) Notice: Subject to any disclaimer, the term of this patent is extended or adjusted under 35 U.S.C. 154(b) by 44 days.

(21) Appl. No.: 17/684,803

(22) Filed: Mar. 2, 2022

(65) Prior Publication Data

US 2022/0348320 A1 Nov. 3, 2022

(30) Foreign Application Priority Data

Mar. 5, 2021 (EP) ..................... 21161126
Jan. 31, 2022 (WO) ................. PCT/EP2022/052238

(51) Int. Cl.
*B64C 29/00* (2006.01)
*B64C 11/00* (2006.01)
(Continued)

(52) U.S. Cl.
CPC ........ *B64C 29/0033* (2013.01); *B64C 11/001* (2013.01); *B64D 27/24* (2013.01); *B64D 33/04* (2013.01)

(58) Field of Classification Search
CPC . B64C 29/0033; B64C 11/001; B64C 11/003; B64C 27/20; F01N 1/16; F02C 7/042
See application file for complete search history.

(56) References Cited

U.S. PATENT DOCUMENTS 3,664,612 A * 5/1972 Skidmore .............. B64D 33/02
                                                          137/15.1
6,151,885 A * 11/2000 Metezeau ............... F02K 1/605
                                                          239/265.29
(Continued)

FOREIGN PATENT DOCUMENTS

| EP | 3909851 A1 | 11/2021 |
| WO | 2017123699 A1 | 7/2017 |
| WO | 2020186305 A1 | 9/2020 |

OTHER PUBLICATIONS

International Search Report and Written Opinion in connection to PCT/EP2022/052238, dated Apr. 7, 2022.

(Continued)

*Primary Examiner* — Tien Q Dinh
*Assistant Examiner* — William L Gmoser
(74) *Attorney, Agent, or Firm* — Meunier Carlin & Curfman LLC

(57) ABSTRACT

The present invention provides an engine 310 of a vertical take-off and landing aircraft 300, wherein the engine is configured to be movable with respect to an aircraft component 342 of the aircraft 300 between a hover position for take-off and landing, and a cruise position for forward flight, wherein the engine 310 comprises an aerodynamic component 332 having at least one aerodynamic element 334 movable between a first position 336 according to a first operational state of the aircraft, and a second position 338 according to a second operational state of the aircraft, the aerodynamic element defining an aerodynamic surface in contact with an airstream passing through the engine.

20 Claims, 6 Drawing Sheets

Figure 1:
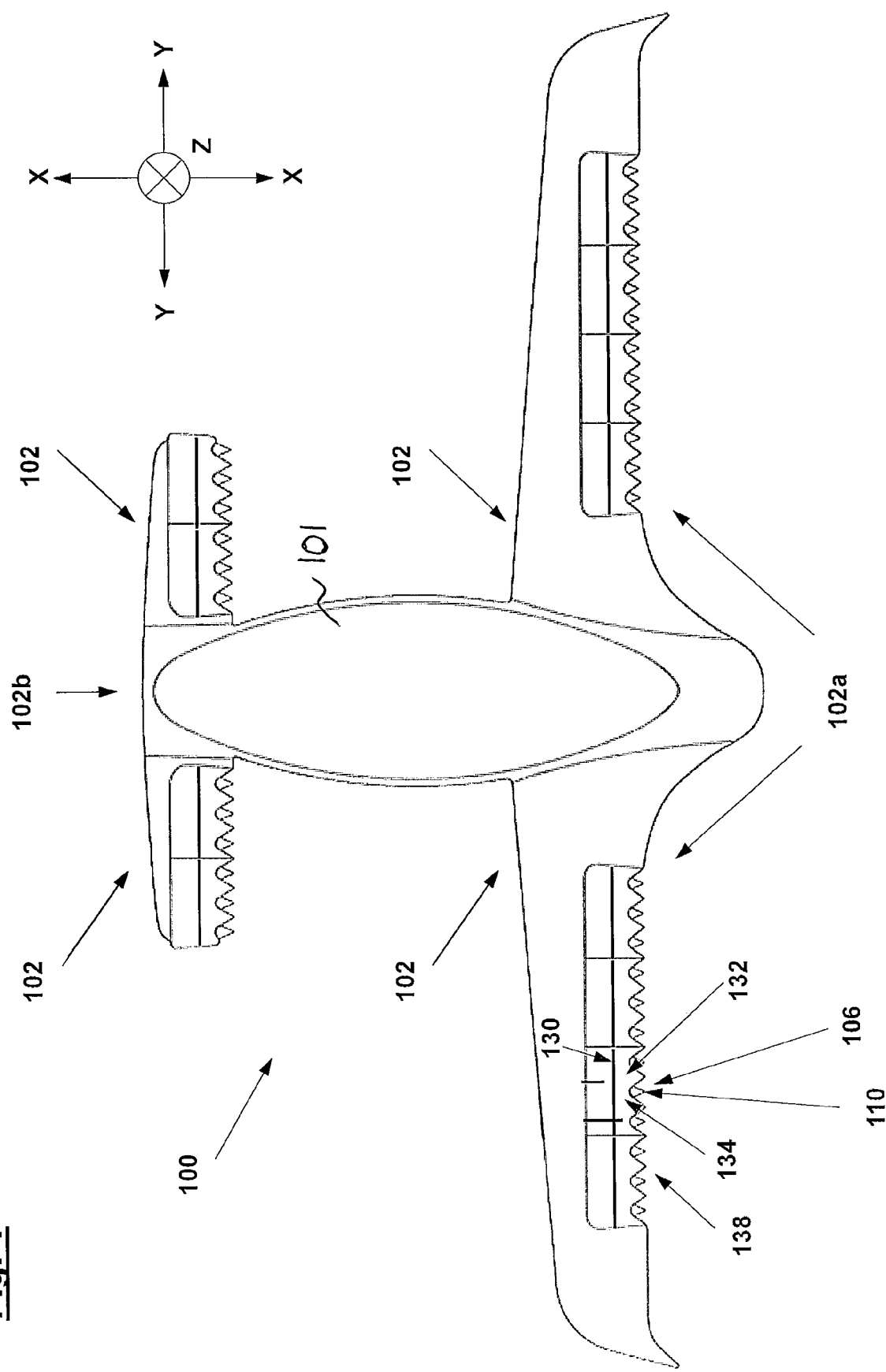

(51) Int. Cl.
*B64D 27/24* (2006.01)
*B64D 33/04* (2006.01)

(56) References Cited

U.S. PATENT DOCUMENTS

| | | | |
|---|---|---|---|
| 6,808,140 | B2 | 10/2004 | Moller |
| 6,910,328 | B1* | 6/2005 | Joyce ........................ F02K 1/11 |
| | | | 239/265.19 |
| 10,570,926 | B2 | 2/2020 | Maciolek |
| 2011/0147533 | A1* | 6/2011 | Goossen ............... B64C 11/001 |
| | | | 415/13 |
| 2015/0122954 | A1* | 5/2015 | Lamb, Jr. ................ F02C 7/042 |
| | | | 244/76 R |
| 2017/0159674 | A1* | 6/2017 | Maciolek .............. B64C 11/001 |
| 2017/0203839 | A1 | 7/2017 | Giannini et al. |
| 2017/0355449 | A1 | 12/2017 | Bapat et al. |
| 2020/0354051 | A1* | 11/2020 | Besse ........................ F02K 5/00 |
| 2022/0018309 | A1* | 1/2022 | Wylie ........................ F02C 7/20 |
| 2022/0024571 | A1* | 1/2022 | Thompson .......... B64C 29/0033 |

OTHER PUBLICATIONS

European Search Report for EP 21 161 126.4, dated Aug. 31, 2021. 6 pages.

\* cited by examiner

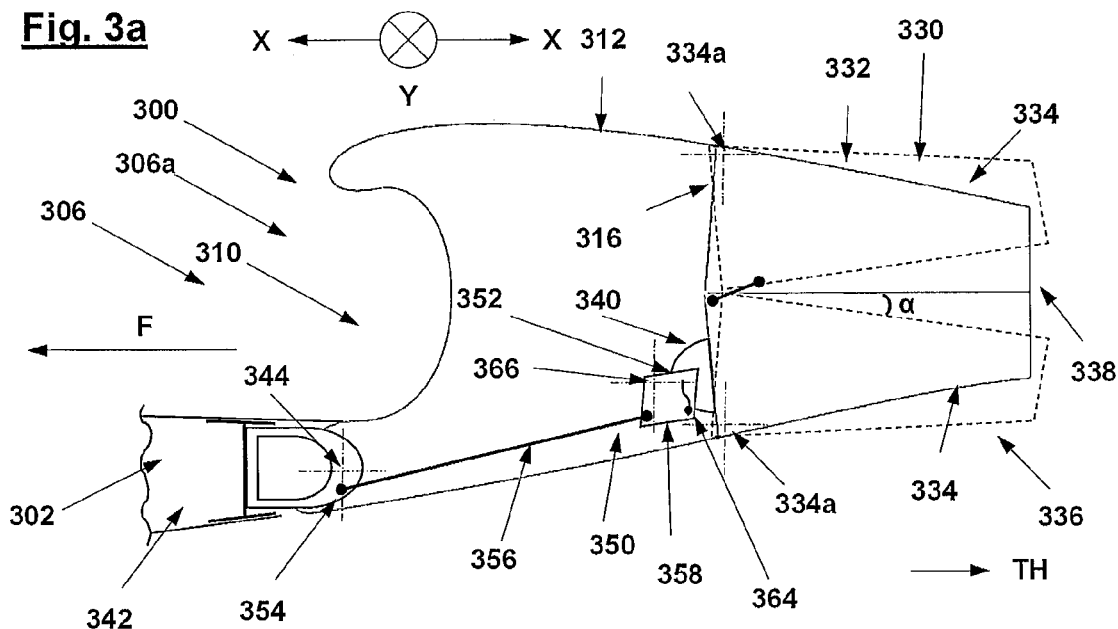
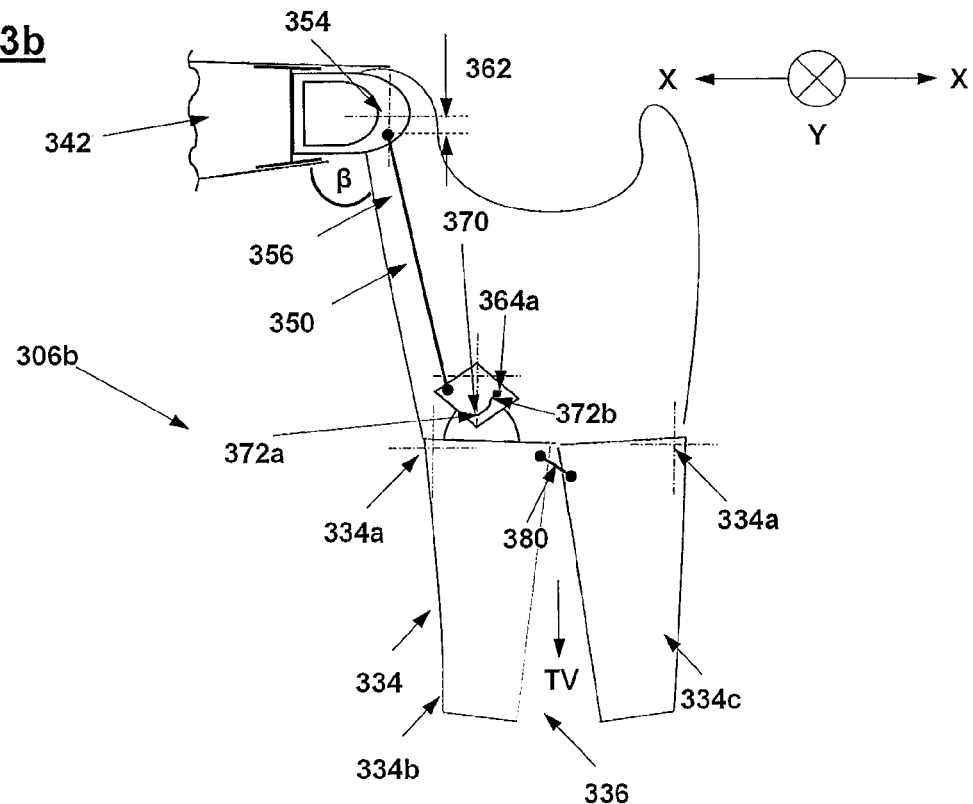

AIRCRAFT ENGINE COMPRISING A VARIABLE AREA EXHAUST NOZZLE

The present invention relates to an engine of a vertical take-off and landing aircraft, wherein the engine is configured to be movable with respect to an aircraft component of the aircraft between a hover position for take-off and landing, and a cruise position for forward flight. Furthermore, the present invention relates to a vertical take-off and landing aircraft comprising such an engine.

Vertical take-off and landing aircrafts (VTOL aircrafts) have gained increased attraction during the last years for their capabilities to start and land at areas of limited size, such as urban areas. Extensive research and development work has been dedicated to the optimization of the engines of VTOL aircrafts to increase the efficiency and performance of the engines in both hover mode (for take-off and landing) and cruise mode (for forward flight). One of the challenges in the design of VTOL aircraft engines is that the aerodynamics of the engine, such as the shape of the inner wall of the duct, and flow areas at intake and exhaust portions, the shape and angle of the rotor and stator blades, etc. can only be optimized for a single flow condition. However, especially in a VTOL aircraft, operating requirements and load of the engines both strongly differ between hover mode during take-off and landing on the one hand and cruise mode during forward flight on the other hand. As a result, engines of VTOL aircraft are usually oversized to allow reliable operation in both modes.

As an example for varying the aerodynamic conditions within an engine by movable aerodynamic elements, variable area exhaust nozzles have been used in the past for gas turbine engines of conventional jet planes, which vary the exhaust nozzle area of the engine such as to optimize flow conditions for different flight situations. This may lead to a reduction of energy consumption while enabling generation of thrust adapted to the specific demands of a specific flight situation. In particular, a variable area exhaust nozzle may adapt the static pressure at an exhaust portion of the engine in order to create optimized flow conditions for different operating conditions. Conventionally, variable area exhaust nozzles are adjusted by dedicated actuators.

U.S. Pat. No. 4,176,792 A discloses a convergent-divergent nozzle comprising a four-bar linkage system and a plurality of servo actuators for a plurality of jaws to vary the exhaust nozzle area. Such a variable area exhaust nozzle has a plurality of complex coupling components and consumes a significant amount of fuel due to its high weight.

Another variable area exhaust nozzle for an engine is known from U.S. Ser. No. 10/570,926 B2 and comprises jaws adjusted by dedicated actuators under consideration of the flight mode. Again, the actuators add substantial weight to the airplane and increase fuel consumption. Further, the nozzle has a significant demand for installation space.

Therefore, it is an object of the present invention to provide an engine having improved aerodynamic conditions in different operating modes, while limiting complexity and/or weight.

This object is achieved by engine of a vertical take-off and landing aircraft, wherein the engine is configured to be movable with respect to an aircraft component of the aircraft between a hover position for take-off and landing, and a cruise position for forward flight, wherein the engine comprises a variable area exhaust nozzle mounted to an exhaust portion of the engine, said variable area exhaust nozzle comprising at least one aerodynamic element movable with respect to the engine between an open position and a closed position, wherein the engine comprises a transmission having a first end connected to the variable area exhaust nozzle and a second end adapted to be connected to the aircraft component, wherein the transmission is adapted to translate a movement of the engine with respect to the aircraft component into a movement of the at least one aerodynamic element. Thus, according an important feature of the present invention, a variable area exhaust nozzle is provided having an aerodynamic element which is movable in accordance to the flight mode, such as to allow changing of the aerodynamic conditions within the engine and adapting the air flow for an optimized operation of the engine in both hover mode and cruise mode. In particular, moving the aerodynamic element moves the aerodynamic surface, for example its angle relative to the incoming air flow or the angle at which the air flow collides with the aerodynamic surface such as to change the exhaust flow area or aerodynamic cross section at the exhaust portion of the engine, thus to change operational characteristics of the engine in accordance to the flight mode. The aerodynamic component may therefore be adjusted such as to ensure equal or similar flow coefficients and reduced friction losses, and the operation in effective operating points for the engine in both hover mode and in cruise mode.

According to the invention, the engine comprises the transmission adapted to translate a movement of the engine with respect to the aircraft component into a movement of the at least one aerodynamic element, i.e. into an opening or closing movement of the variable area exhaust nozzle. Accordingly, in a vertical take-off and landing aircraft using such engine, movement of the engine between cruise position and hover position may be directly transmitted to the aerodynamic element of variable area exhaust nozzle such as to move the aerodynamic element. As a result, the variable area exhaust nozzle may be set to the suitable configuration for the particular flight mode (hover or cruise). In particular, the transmission may be configured to set the variable area exhaust nozzle (i.e. the aerodynamic element) to the open position when the engine assumes the hover position, and to set the variable area exhaust nozzle (i.e. the aerodynamic element) to the closed position when the engine assumes the cruise position. It has been found that the engines and thus the aircraft achieve an optimum performance, if a ratio between a cruise exhaust nozzle area, i.e. an exhaust cross-sectional area in the closed position of the nozzle, and the hover exhaust nozzle area, i.e. an exhaust cross-sectional area in the open position of the nozzle, is within a range from 0.53 to 0.76, preferably in a range from 0.61 to 0.69, most preferably is set to 0.65.

As a first advantage of the transmission, a separate actuator for driving the variable area exhaust nozzle can be omitted such that complexity and weight of the engine can be reduced. As the transmission may be a fully mechanical device, additional electrical or electro-mechanical components, such as an actuator control system, may be avoided. As a second advantage of the transmission, since the movement of the variable area exhaust nozzle is determined by the movement of the engine, one degree of freedom with respect to control and testing can be dispensed with, which leads to a reduction of controlling effort and an improved safety. Additionally, the testing of every position or opening degree of the variable area exhaust nozzle for every pivotal position of the engine between hover and cruise is not required anymore, so the testing effort significantly decreases as well.

The variable area exhaust nozzle relative to which the engine is movably mounted may be an airfoil, such as a wing or a canard, or may be a fuselage of an aircraft or a component fixed to an airfoil or a fuselage of an aircraft. Therefore a structure which is fixed relative to the main carrier of the aircraft is preferably chosen as a reference point of controlling the movement of the variable area exhaust nozzle.

In a preferred embodiment of the invention, the range of movement of the engine with respect to the aircraft component between hover position and cruise position comprises a first range and a second range, wherein the transmission is configured such as to have a first transmission ratio when the engine moves within the first range, and to have a second transmission ratio lower than the first transmission ratio when the engine moves within the second range. Therefore, the transmission is provided with different transmission ratios depending on the position of the engine relative to the aircraft component. For example, even if the engine pivots from hover mode to cruise mode with constant angular speed, an associated pivoting movement of the aerodynamic element may be performed with two or more different speeds, depending on the position of the engine. The opening degree of the variable area exhaust nozzle may thus be set as desired for each pivotal position of the engine.

Furthermore, the range of movement of the engine with respect to the aircraft component between hover position and cruise position may comprise an idle range, wherein movement of the engine within the idle range is not transformed to a movement of the aerodynamic element. In particular, the position of the aerodynamic element relative to the engine may be fixed during movement of the engine within the idle range. In this way, adjustment of the opening degree of the variable area exhaust nozzle may be adapted within intermediate states between hover position and cruise position.

In order to implement the function of the idle range with simple mechanical means, the aerodynamic element or the transmission may remain in abutment with a mechanical stop for fixing the position of the aerodynamic element with respect to the engine in the idle range, and/or the transmission may comprise an elastic member, which is arranged to accommodate movement of the engine with respect to the aircraft component within the idle range, such that the movement of the engine is not translated into change of the opening degree of the variable area exhaust nozzle.

The transmission may preferably comprise linkage means, e.g. a rod and/or a cam mechanism, more particular a slotted cam. Especially when using a cam mechanism, by virtue of choosing a specific shape of a cam surface of the cam mechanism (such as a shape of a slot of a slotted cam), the movement of the aerodynamic element can be predefined as being dependent on the relative position between the engine and the aircraft component. Furthermore, the aerodynamic element may be biased towards the first position or towards the second position by an elastic member, e.g. an extension spring, such as to move the aerodynamic element by using simple mechanical means.

Another reliable mechanical transmission which may be designed to bridge a relatively long distance between the aircraft component and the variable area exhaust nozzle may comprises a pulley transmission, in particular comprising at least a first pulley connected to the aerodynamic element, a second pulley adapted to be connected or to be fixed relative to an aircraft component, and a belt for transmitting movement of one of the pulleys to the other one of the pulleys. To provide for different transmission ratios depending on the position of the engine relative to the aircraft component, at least one of the pulleys may have a non-circular cross section. A non-circular cross section is any cross section that deviates from a single circle. The belt may be tensioned by a tensioning means.

In another embodiment of the invention, the variable area exhaust nozzle comprises a first aerodynamic element and a second aerodynamic element, wherein the first and second aerodynamic elements are connected to one another by a link mechanism, preferably comprising a linkage and/or a slotted cam, such that movement of the first aerodynamic element drives movement of the second aerodynamic element. Thus, the transmission may just drive a first aerodynamic element, while a second aerodynamic element (or any additional aerodynamic elements) may be driven by said first aerodynamic element through the link mechanism. Therefore an additional transmission or actuator for the second aerodynamic element (or any further aerodynamic element) may be dispensed with.

According to another embodiment of the invention, the engine may comprise an aerodynamic control device adapted to control movement of the aerodynamic element based on movement of the engine with respect to the aircraft component. As a result, the movement of the aerodynamic element is directly connected to the movement of the engine between hover position and cruise position by virtue of dedicated control through the control device. Dedicated control in this sense means that the control device operates on an electronic level and/or hardware level which ensures, at least in a normal (non-emergency) operational state of the aircraft, that operation of the control device cannot be overruled by a flight computer of the aircraft and/or by pilot commands. In this way, one degree of freedom with respect to control and testing can be dispensed with, which leads to a reduction of controlling effort and an improved safety. Additionally, the testing of every position or opening degree of the variable area exhaust nozzle for every pivotal position of the engine is not required anymore, so the testing effort significantly decreases as well.

For example, the control device may be connected to receive signals from an engine mode actuator driving a movement of the engine between hover position and cruise position. In addition or alternatively, the control device may be part of or connected to a transmission, such as the transmissions described in the various embodiments above.

In a preferred embodiment of the invention, the at least one aerodynamic element is a baffle plate or a jaw of the variable area exhaust nozzle adapted to deflect an exhaust air flow of the engine and define an exhaust area of the engine. By adjusting the exhaust area of the engine, the static pressure within the engine may be adapted to the current load and to the particular flight mode such as to allow operation of the engine at equal or at least similar effective operating points both during hovering and during cruise.

More particular, if the aerodynamic element may be a general C-shaped jaw when viewed in a thrust direction of the engine, which allows the jaw to at least partially surround the exhaust area. For example, two jaws of general C-shape may define the exhaust area and allow changing the exhaust area between an open position and a closed position of the nozzle, when the jaws are arranged such that their C-shapes face one another. Furthermore, depending on the particular C-shape of the at least one jaw, the exhaust area may be configured in a circular form or, alternatively, in a generally polygonal form, for example in a generally rectangular form. In order to reduce turbulences, the generally polygonal form may have rounded edges.

The invention further provides a vertical take-off and landing aircraft comprising aircraft components such as a fuselage, wings etc., and one or more engines configured according to the embodiments of the invention as described above. The vertical take-off and landing aircraft may comprise an airfoil and a plurality of engines, preferably more than 5 engines, more preferably more than 10 engines, mounted adjacent to one another to the airfoil such as to form a row to allow air streams of adjacent engines to merge and support one another. This achieves distributed propulsion.

Each of the engines may be pivotable with respect to the airfoil independently from the other engines. In particular, each engine may be pivoted relative to the airfoil to assume a position (angle with respect to the airfoil) which is different from that of the other engines, especially different from that of its adjacent engines or all other engines. In this way, maneuverability and redundancy of operation can be enhanced.

Alternatively, an engine arrangement carrying a plurality of engines, for example 3 engines, fixed thereto may be used to allow pivoting the plurality of engines in unison by pivoting the engine arrangement. Furthermore, such engine arrangement may have one common variable area exhaust nozzle, such the exhaust areas of all engines of the plurality of engines are controlled by a common variable area exhaust nozzle. The plurality of engines of an engine arrangement may be arranged in a row, especially in a row extending in lateral direction, such that the engines are placed side-by-side adjacent to one another.

In all embodiments of the invention the at least one engine or the at least one engine arrangement may be mounted to a trailing edge of the airfoil, in order to provide control over the aerodynamic loads on the wing. Furthermore the at least one engine or the at least one engine arrangement may be mounted at an upper portion of the airfoil such as to control an air flow over the upper side of the airfoil.

The invention will be described in more details with respect to specific embodiments referring to the enclosed drawings, in which:

FIG. 1 shows a schematic layout of an aircraft equipped with an engine arrangement and a variable area exhaust nozzle according to a first embodiment of the present invention.

Figure 2A:
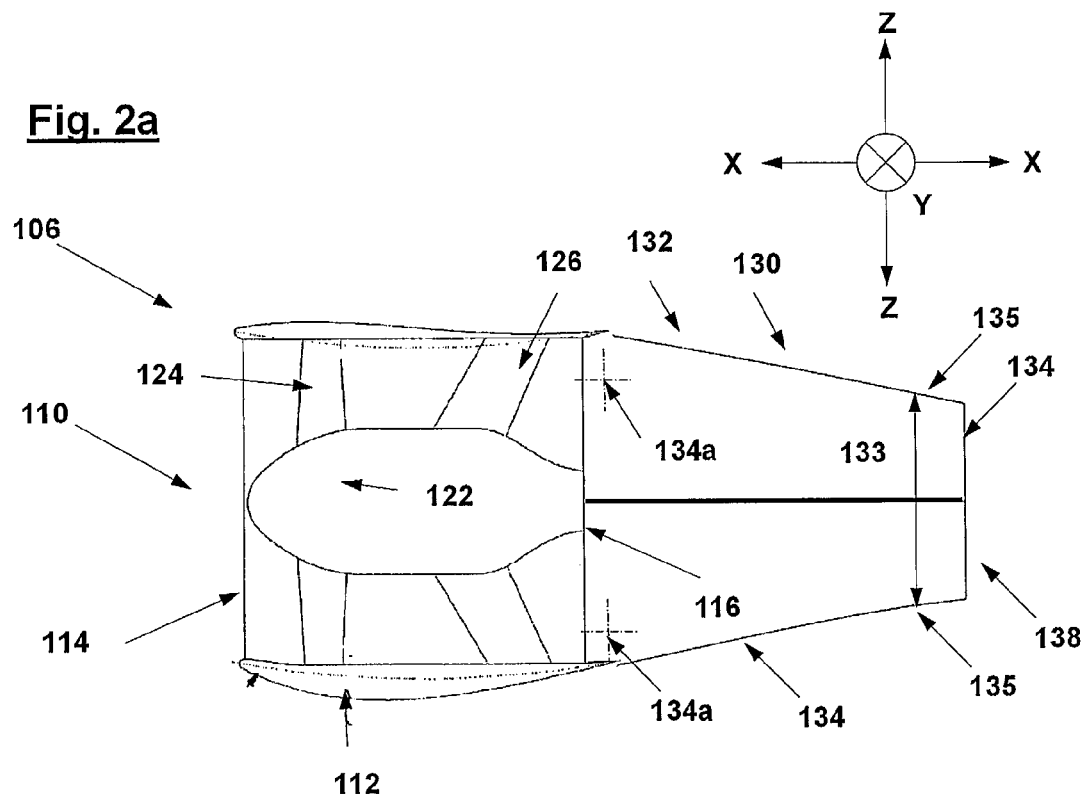
Figure 2B:
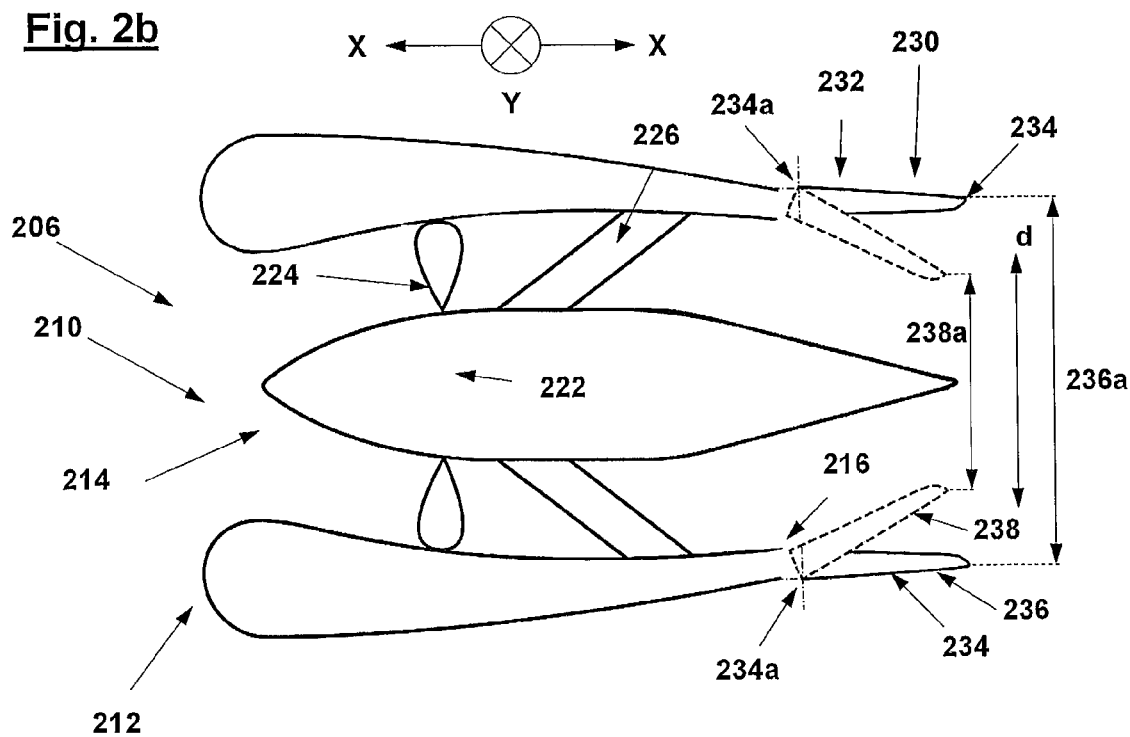

FIGS. 2*a* and 2*b* show cross sectional views of engine arrangements equipped with variable area exhaust nozzles according to the first embodiment and according to a second embodiment of the present invention, respectively.

FIGS. 3*a* and 3*b* show a variable area exhaust nozzle in a closed position (FIG. 3*a*) and an open position (FIG. 3*b*) according to a third embodiment of to the present invention.

Figure 4A:
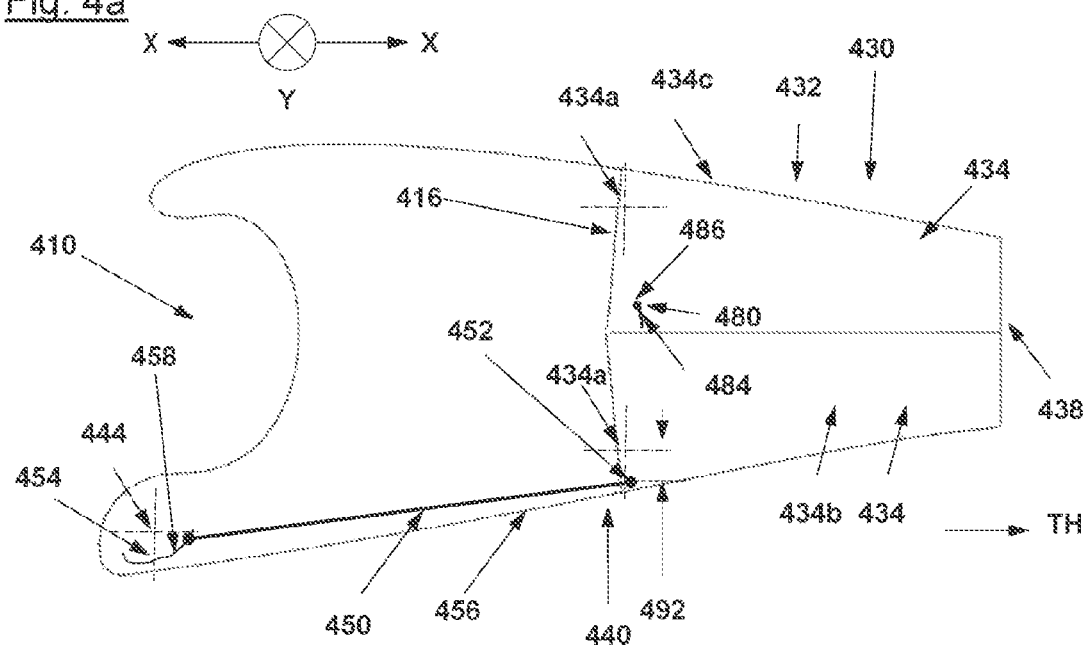

FIG. 4*a* shows a variable area exhaust nozzle in a closed position according to a fourth embodiment of the present invention.

Figure 4B:
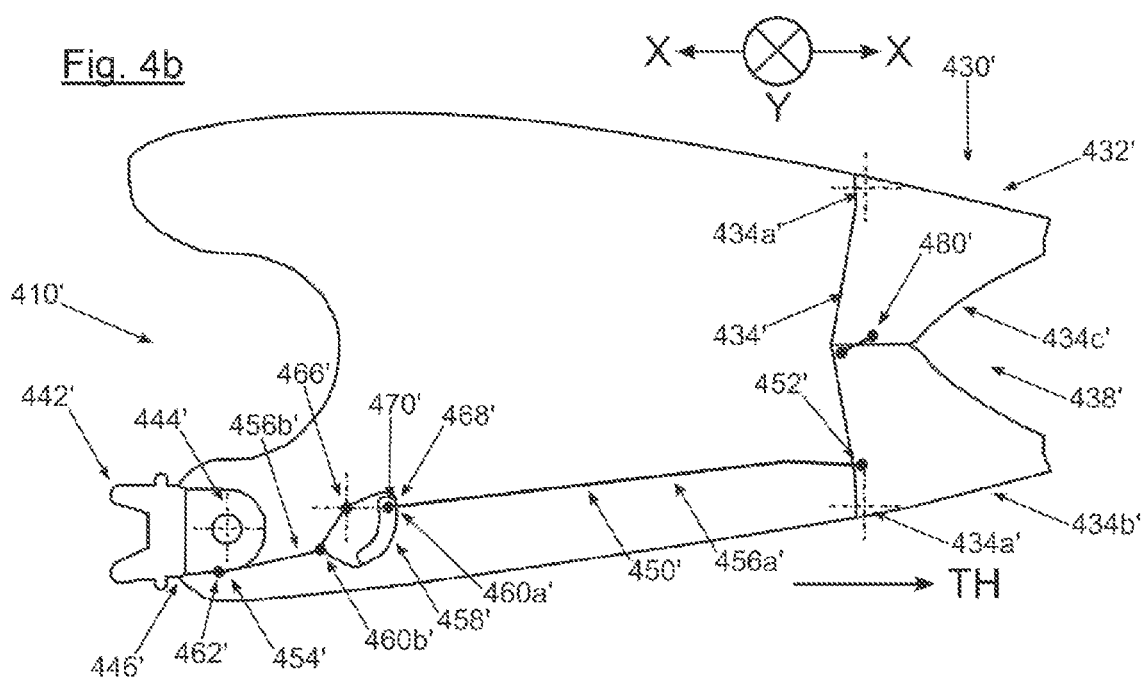
Figure 4C:
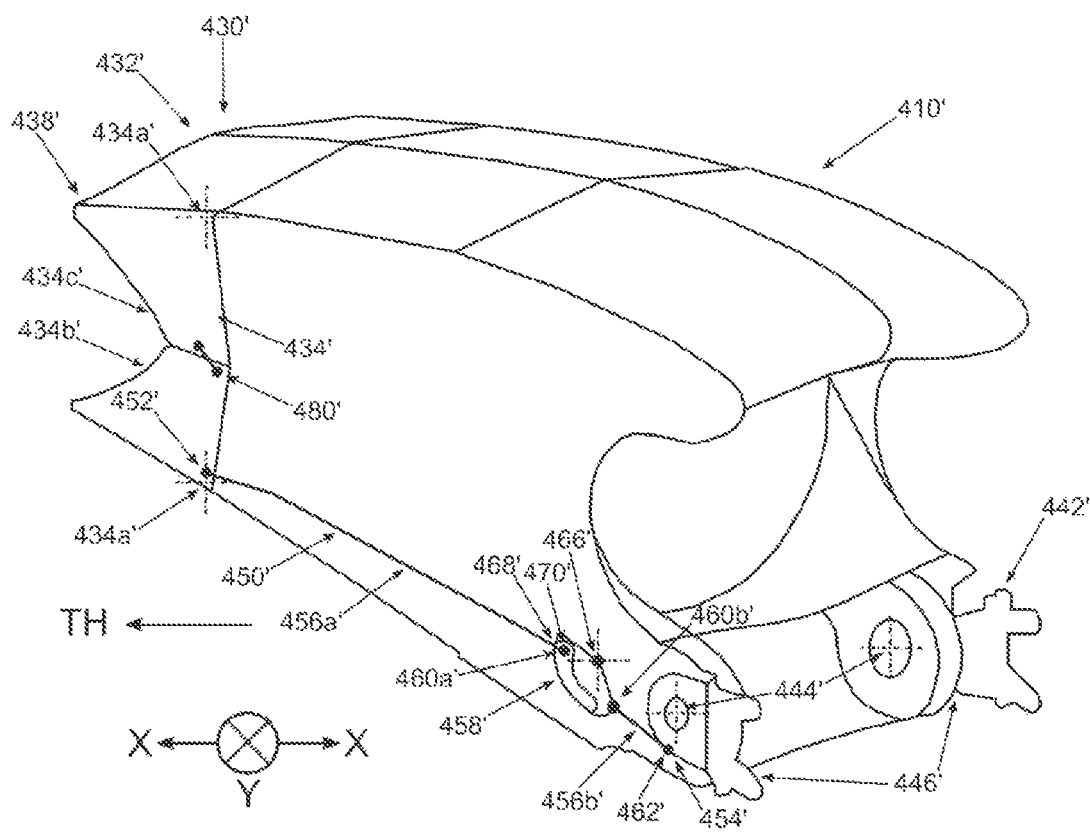

FIGS. 4*b* and 4*c* show a variant of the variable area exhaust nozzle according to the fourth embodiment in a closed position.

Figure 5:
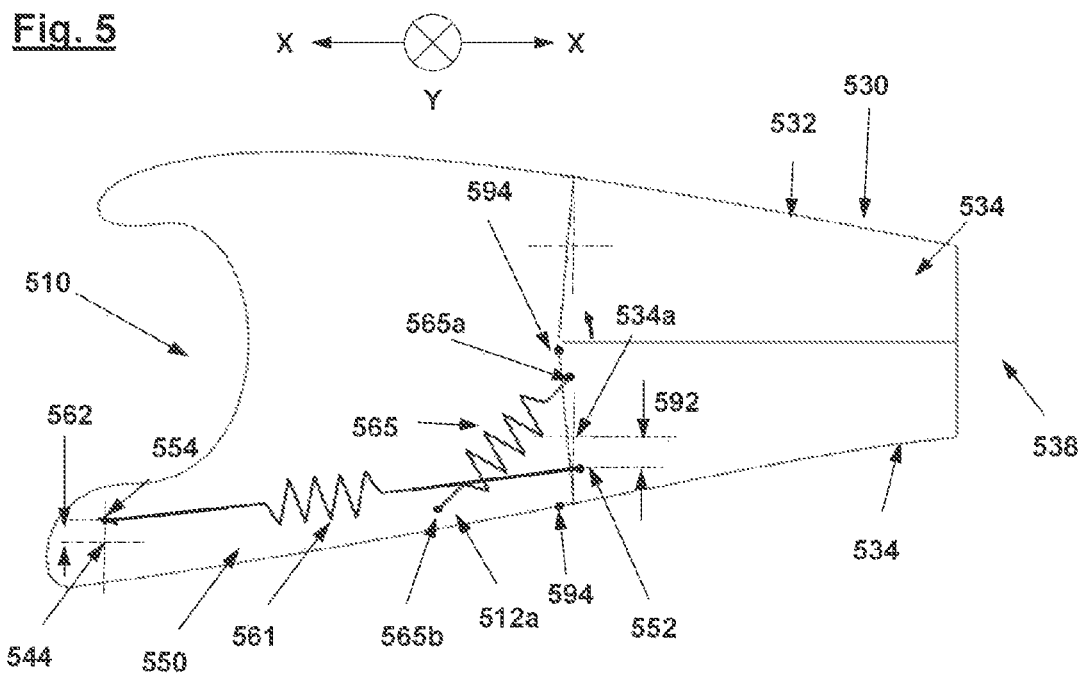

FIG. 5 shows a variable area exhaust nozzle in a closed position according to a fifth embodiment of the present invention.

Figure 6A:
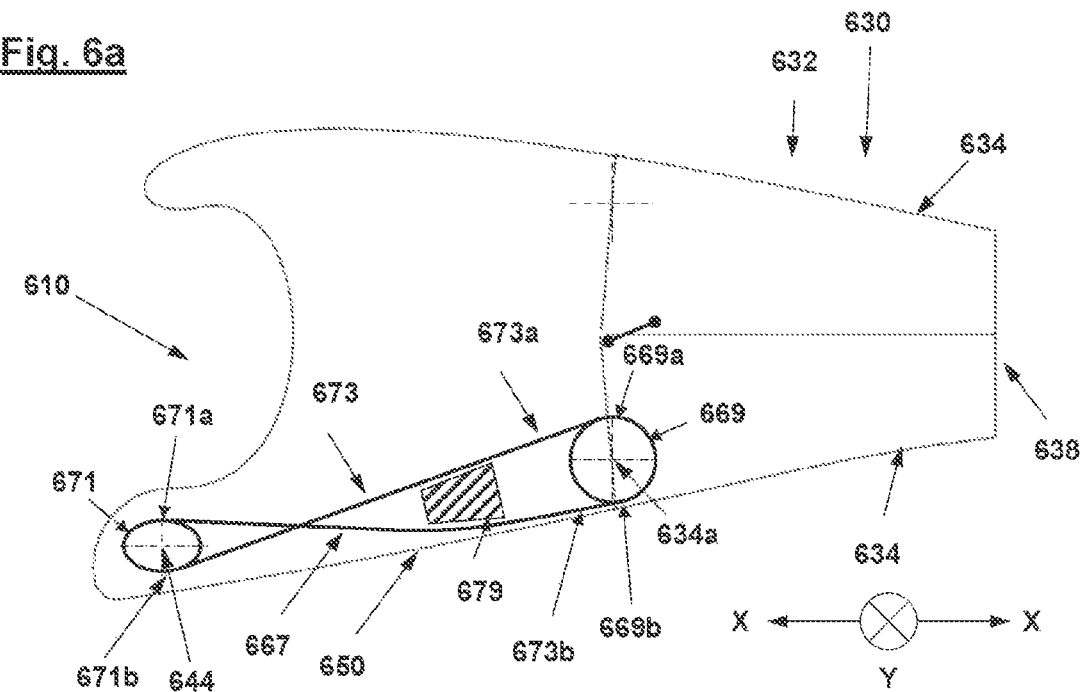
Figure 6B:
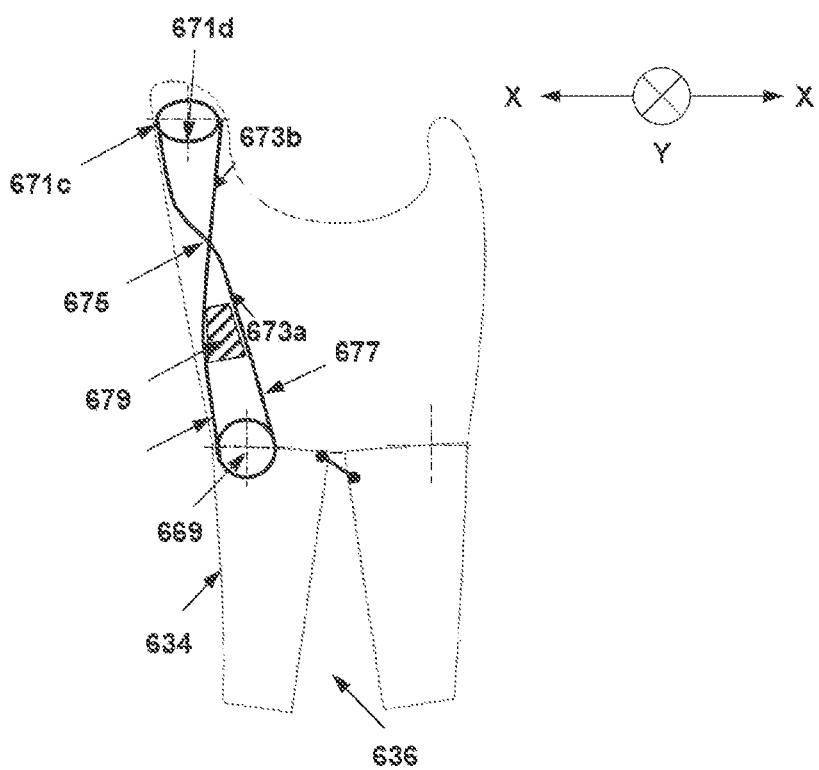

FIGS. 6*a* and 6*b* show a variable area exhaust nozzle in a closed position (FIG. 6*a*) and an open position (FIG. 6*b*) according to a sixth embodiment of the present invention.

Throughout the present disclosure, directions usually refer to a situation when the aircraft is parking or flying parallel to the ground. This means, a heading direction X of the aircraft extends along the roll axis of the aircraft, a lateral direction Y extends horizontally along a lateral axis (pitch axis) of the aircraft, and a vertical direction Z extends upwards along a vertical axis (yaw axis) of the aircraft.

In FIG. 1, a vertical take-off and landing aircraft (VTOL aircraft) is generally denoted by reference numeral 100. Aircraft 100 comprises a fuselage 101 and airfoils 102, for example a pair of wings 102*a* arranged at a rear portion of fuselage 101 and a pair of canards 102*b* at a front portion of fuselage 101. Each airfoil 102 carries at least one, preferably a plurality of engine arrangements 106, each comprising at least one engine 110, in particular an electric engine, such as an electric ducted fan. In the illustrated example, each engine arrangement 106 includes three engines 110.

A plurality of engines 110, preferably more than 5 engines, may be arranged adjacent to one another in a row such as to allow air streams of adjacent engines to merge and support one another and thus form a continuous stream having a relatively large width in lateral direction. In the illustrated example, each of the rear wings 102*a* carries more than 10, in particular 12 engines, wherein each of the canards 102*b* carries more than 5, in particular 6 engines, resulting in a total number of more than 30, in particular exactly 36 engines, such that the aircraft can be operated with high redundancy, high efficiency and low noise.

Each engine arrangement 106 is pivotably mounted to its airfoil 102 such as to be able to pivot about a lateral engine pivot axis between a hover position suitable for take-off and landing, in which a thrust direction of the at least one engine 110 of the engine arrangement 106 is oriented in vertical direction Z, and a cruise position suitable for forward flight, in which a thrust direction of the at least one engine 110 of the engine arrangement 106 is oriented substantially parallel to the heading direction X.

According to the first embodiment of the invention, each engine arrangement 106 comprises a variable area exhaust nozzle 130 mounted to an exhaust portion of the engine arrangement 106. The variable area exhaust nozzle 130 preferably comprises a jaw arrangement 132 having at least one movable jaw 134, preferably two jaws, adapted to move between an open position defining a relatively large exhaust nozzle area, and a closed position defining a relatively small exhaust nozzle area.

Preferably, one engine arrangement has only one variable area exhaust nozzle 130, such that in a case that one engine arrangement 106 includes a plurality of engines, for example three engines 110, the exhaust areas of all engines are controlled by a common variable area exhaust nozzle.

The variable exhaust nozzle 130 can be moved to define different opening degrees corresponding to different exhaust nozzle areas, in particular, a cruise exhaust nozzle area when set to a closed or cruise configuration, and a hover exhaust nozzle area, when set to an open or hover configuration. By changing the exhaust nozzle area between the cruise exhaust nozzle area and the hover exhaust nozzle area, the static pressure at the exhaust portion is varied and therefore the aerodynamic characteristics can be adapted in cruise and hover position. The engine 110 may therefore efficiently be operated as desired, in particular at similar effective operating point and/or at similar flow conditions during both, cruise and hover flight. It has been found that the engines and thus the aircraft achieve an optimum performance, if a ratio between the cruise exhaust nozzle area and the hover exhaust nozzle area is within a range from 0.53 to 0.76, preferably in a range from 0.61 to 0.69, most preferably is set to 0.65.

FIG. 2*a* shows details of the engine arrangement of the first embodiment 106 in a cruise position. The engine 110 comprises an engine housing 112 elongating in heading direction X from an inlet portion 114 to an exhaust portion 116. Within the engine housing 112, a rotor 122 having rotor blades 124 and stator blades 126 are arranged. The stator blades 126 hold the rotor 122 in the center of the engine housing 112.

Adjacent to the exhaust portion 116, the variable area exhaust nozzle 130 is mounted to the engine housing 112. The variable area exhaust nozzle 130 comprises the jaw arrangement 132 having the at least one jaw 134 movable around a jaw pivot axis 134a, which may be arranged in the lateral direction Y. The jaw pivot axis 134a is illustrated with a dot-dashed cross. The jaw arrangement 132 is movable between an open position 136 (not shown) and a closed position 138.

In the closed position 138, two adjacent jaws 134 may be in abutment to each other in essentially vertical direction Z. Further, a distance 133 between a peripheral surface 135 of the adjacent jaws 134 is decreasing from an end at an exhaust portion 116 to an opposite end in a direction of the roll axis X. The at least one jaw 134 may be formed with a C-shaped cross section when viewed in direction of the roll axis X.

A second embodiment of an engine arrangement and a variable area exhaust nozzle is shown in FIG. 2b, which substantially corresponds to the embodiment of FIG. 2a. Therefore, in FIG. 2b, analogous parts are provided with the same reference numerals as in FIG. 2a, but increased by 100. For example, a closed position 238 illustrated in FIG. 2b corresponds to the closed position 138 as shown in FIG. 2a. Further, the engine arrangement 206 and the variable area exhaust nozzle 230 are only described in the following insofar as it differs from the variable area exhaust nozzle 130 and the engine arrangement 106 of the first embodiment in FIG. 2a, and reference is made to the description of the first embodiment with respect to all other features and functions.

The engine arrangement 206 comprises an engine housing 212 elongating from an inlet portion 214 to an exhaust portion 216. Further, the engine housing 212 houses a rotor 222 having rotor blades 224 and stator blades 226.

Adjacent to the engine housing 212, a variable area exhaust nozzle 230 is arranged. The variable area exhaust nozzle 230 comprises a jaw arrangement 232 having at least one jaw 234 movable around a jaw pivot axis 234a. This jaw pivot axis 234a may be arranged in lateral direction Y.

According to the second embodiment, the jaw arrangement may have two jaws 234, approaching each other in a closed position 238, represented with dashed lines, and a closed distance or cruise exhaust nozzle area 238a is formed in between. The jaw arrangement 232 in an open position 236, marked by a solid line, forms an opened distance or hover exhaust nozzle area 236a between the two jaws 234. The at least one jaw 234 may have a substantially trapezoid shape viewed in lateral direction Y.

The exhaust nozzle areas 238a, 236a are determined by the shape of the cross-section of the variable area exhaust nozzle and a distance d. The variable area exhaust nozzle 230 may have a rectangular cross-section viewed in the direction of the roll axis X.

FIGS. 3a and 3b show a third embodiment of the variable area exhaust nozzle, which substantially corresponds to the first and second embodiments of FIGS. 2a and 2b. Therefore, in FIGS. 3a and 3b, analogous parts are provided with the same reference numerals as in FIG. 2a, but increased by 200 and as in FIG. 2b, but increased by 100, respectively (e.g. jaw pivot axis 334a analogous to jaw pivot axis 134a and jaw pivot axis 234a, aircraft 300 to aircraft 100 and engine arrangement 306 to engine arrangement 106). Further, the variable area exhaust nozzle 330 is only described in the following insofar as it differs from the variable area exhaust nozzle 130 of FIG. 2a and from the variable area exhaust nozzle 230 of FIG. 2b.

The jaw arrangement 332 of the third embodiment comprises at least one jaw 334 mounted with a mounting portion 340 to the exhaust portion 316 of an engine 310, respectively an engine housing 312. The mounting portion 340 may be a hinge or a linkage or the like. The at least one jaw 334 is movable between an open position 336, indicated by a dashed line, and a closed position 338, indicated by a solid line.

With reference to FIGS. 3a and 3b, in a cruise position 306a, the thrust direction TH of the engine 310 may be parallel to the heading direction X or the roll axis or may be inclined to the heading direction X or the roll axis by an angle smaller than 15 degree. Further, in a hover position 306b, the thrust direction TV of the engine 310 may be parallel to the vertical direction Z or may be inclined to the vertical axis Z by an angle smaller than 15 degree. If the engine 310 rotates from the cruise position 306a to the hover position 306b, the at least one jaw 334 moves from a closed position 338 to an open position 336.

The engine 310 is movable with respect to an aircraft component 342 around an engine pivot axis 344. This movement of the engine 310 may be driven in a well-known manner by a motor (not shown).

In order to translate the movement of the engine 310 to a movement of the at least one jaw 334 a transmission 350 is provided, which comprises a linkage means 356 and a cam mechanism 358. For example, the linkage means 356 is a rod and the cam mechanism 358 is a slotted cam. Said transmission 350 is connected with a first end 352 to the jaw arrangement 332 and with a second end 354 to the aircraft component 342, which may be an airfoil 302 of the aircraft 100.

At the second end 354, the linkage means 356 is connected to the aircraft component 342 by a hinge joint in an offset distance 362 to the engine pivot axis 344. Said linkage means 356 is connected to the cam mechanism 358 by another hinge joint. Said cam mechanism 358 is connected to the at least one jaw 334. The cam mechanism 358 is movable around a cam axis 366, which is indicated with a dot-dashed cross.

The engine 310 is movable with respect to the aircraft component 342 by about 90° between a hover position, as shown in FIG. 3b, and a cruise position, as depicted in FIG. 3a. When the engine 310 moves around the engine pivot axis 344, the linkage means 356 also performs a movement. Due to the hinge joint, the cam mechanism 358 is rotated around the cam axis 366, when the engine 310 is rotated.

According to the third embodiment, the cam mechanism 358 comprises a slotted cam 370 and a pin 364a, which are in engagement with each other. The pin 364a is in a fix connection to the jaw arrangement 332. As the slotted cam 370 moves, the pin 364a accomplishes a movement according to the shape of the slot of the slotted cam 370. This movement results in a movement of the jaw arrangement 332 and the at least one jaw 334. During manufacturing of the engine, the shape of the slot may for example be designed by rotating the jaw 334 (for example in a simulation or geometric calculation) to the desired angles for each position of the engine between cruise mode and hover mode, and determining the corresponding path of the pin 364a which thus defines the path of the slot. In operation, the pin 364a is then forced to follow this path when the engine is pivoting.

The cam mechanism 358, in particular the slot of the slotted cam 370, may comprise a first portion 372a having a first shape defining a first transmission ratio and a second portion 372b having a second shape defining a second transmission ratio. Movement of the pin 364a within the first portion 372a may lead to a movement of jaws 334 with higher speed, movement of the pin 364a within the second portion 372b may lead to a movement of jaws 334 with lower speed. This means that, as far as movement of the engine 310 with respect to the aircraft component 342 is concerned, there is provided a first range, for example at or near the cruise position, in which the jaws 334 open or close with relatively high speed, while in a second range, for example at or near the hover position, the jaws 334 open or close with relatively low speed. As a result, the speed of the movement of the jaws 334 is not strictly linear to the movement of the engine, but may differ for different positions of the engine. Consequently an exhaust nozzle area is determined in dependence of an opening angle α of the jaws 334 and with respect to an engine angle β between the aircraft component 342 and the engine 310.

Furthermore, the slot of the slotted cam 370 may comprise a third portion (not shown), in which the slot follows a circular section of constant radius around the cam axis 366, such that relative movement between the slotted cam 370 and the pin 364a within the circular section does not lead to a movement of the pin 364a about the jaw axis 334a and hence, keeps the angular position of the jaws 334 fixed with respect to the engine 310. In other words, as long as the pin 364a moves within the third portion of the slot, movement of the engine 310 with respect to the aircraft component 342 is not translated into a movement of the jaws 334.

The jaw arrangement 332 may comprise a plurality of jaws, e.g. two jaws 334b, 334c. These jaws 334b, 334c may be connected to one another by a link mechanism 380. Said link mechanism 380 may be a hinge fixed with the jaws 334b, 334c. The movement of one jaw 334b is transmitted to the at least one other jaw 334c via the link mechanism 380. Thus, both jaws 334b, 334c move, e.g. from the closed position 338 into the open position 336, in accordance with and driven by the movement of the engine 310. Movement of both jaws 334b, 334c may be essentially simultaneous. Alternatively, both jaws 334b, 334c may be opened and closed in a staggered manner.

FIG. 4a shows a fourth embodiment of the variable area exhaust nozzle, which substantially corresponds to the third embodiment of FIGS. 3a and 3b. Therefore, in FIG. 4a, analogous parts are provided with the same reference numerals as in FIGS. 3a and 3b, but increased by 100 (e.g. engine 410 analogous to engine 310). Further, the variable area exhaust nozzle 430 is only described in the following insofar as it differs from the variable area exhaust nozzle 330 of FIGS. 3a and 3b, and reference is made to the description of the third embodiment for all other features and functions.

A variant of the fourth embodiment is illustrated in FIGS. 4b and 4c, which relates to the concept of transmission as depicted and explained with respect to FIG. 4a. References signs in FIGS. 4b and 4c are therefore predominantly analogous to FIG. 4a, but shown with an additional apostrophe (e.g. engine 410'). FIGS. 4a and 4b illustrate an engine 410, 410' viewed along the lateral direction Y, whereas FIG. 4c is a perspective view of the engine 410'.

In FIG. 4a, a jaw arrangement 432 is mounted to an exhaust portion 416 of the engine 410 with a mounting portion 440. For controlling a movement of the jaw arrangement 432 comprising at least one jaw 434 and for translating a movement of the engine 410 into the movement of the at least one jaw 434, a transmission 450 is associated to a variable area exhaust nozzle 430. As a result, the movement of the variable area exhaust nozzle 430 is directly connected to the movement of the engine 410. The engine 410 may be rotated from a hover position (not shown) with substantially vertical thrust direction to a cruise position with thrust direction TH substantially parallel or almost parallel to the heading direction X.

A first end 452 and a second end 454 of the transmission are connected to each other with a linkage means 456. At the first end 452, the transmission is connected by a hinged joint to at least one jaw 434, in particular to a first jaw 434b of the jaw arrangement 432. Each jaw 434 is movable around a jaw pivot axis 434a, which may be orientated in a lateral direction Y. In FIG. 4a the transmission 450 is connected to the first jaw 434b with a jaw offset distance 492 to the jaw pivot axis 434a.

At the second end 454 the transmission 450 is connected to an aircraft component with a cam mechanism 458. The cam mechanism 458 may comprise a slotted cam fixed to the aircraft component in engagement with an actuation pin, which is connected to the linkage means 456. Further, the cam mechanism 458 is arranged around an engine pivot axis 444.

As shown in FIG. 4a, upon pivoting the engine 410 from cruise position into hover position or vice versa, the linkage means 456 performs a movement around the engine pivot axis 444 guided by the cam mechanism 458 at the second end 454. Because the jaw offset distance 492 between the first end 452 of the transmission 450 and the jaw pivot axis 434a, the movement of the engine 410 is translated into a movement of the first jaw 434b around the jaw pivot axis 434a.

In order to translate this movement to an at least one other jaw 434c, the first jaw 434b and the at least one other jaw 434c are connected to one another by a link mechanism 480. According to the fourth embodiment, this link mechanism 480 may be a slotted cam mechanism 484. Therefore, an actuation pin 486 is attached to the first jaw 434b protruding into the at least one other jaw 434c. The actuation pin 486 may be integrally connected to the first jaw 434b. At the at least one other jaw 434c, a slot of the slotted cam mechanism 484 is provided. Said actuation pin 486 is in engagement with the slot of the slotted cam mechanism 484. The slot may be formed as a curve with an inclination such as to rotate the jaws 434b, 434c in opposed directions such as to open or close the jaw arrangement 432. Of course, the first jaw 434b may be provided with the slot of the slotted cam mechanism 484 and the at least one other jaw 434c may be provided with the actuation pin 486.

With respect to FIG. 4a, FIGS. 4b and 4c illustrate an alternative jaw design and further specify a cam mechanism 458' including the interaction between a transmission 450', which is associated to a variable area exhaust nozzle 430', and an aircraft component 442' upon pivoting movement of the engine 410'. In contrast to the jaws 434 shown in FIG. 4a, jaws 434b', 434c' of a jaw arrangement 432' may exhibit a substantially shorter length along their extension in the heading direction X, leading to a lower weight of the jaws 434b', 434c'. In combination with the beveled shape of the jaws 434' the aerodynamic cross section at the exhaust portion of the engine 410' can thus be further optimized. The alternative jaw design depicted in FIGS. 4b and 4c may also be applied to the other embodiments, whereas the corresponding engine 410' may be equipped with the jaws 434 according to FIG. 4a.

Each engine 410' is rotatably engaged with the aircraft component 442' by means of connecting portions 446', for example two connecting portions 446', with a common axle (not shown) adapted to allow for controlled pivoting movement of the engine 410' around an engine pivot axis 444'. In addition to first linkage means 456a' connecting the transmission 450' to the jaw arrangement 432', particularly jaw 434b', via a first end 452', second linkage means 456b' may be provided. Such second linkage means 456b', which may be shorter than the first linkage means 456a', are rotatably connected to the connecting portion 446' of the aircraft component 442' at a second end 454' by means of a pin 462', thus allowing for rotation of the second linkage means 456b' according to the pivoting direction of the engine 410'. The cam mechanism 458' is arranged between the first and second linkage means 456a', 456b' and rotatably secured to the engine 410' at a cam axis 466'.

The first and second linkage means 456a', 456b', which are connected to a slotted plate of the cam mechanism 458' via first and second intermediate ends 460a', 460b', respectively, are substantially aligned with respect to their main extension direction and remain so also during pivoting of the engine 410'. A pin 470', which is attached to the first linkage means 456a' at the first intermediate end 460a', is guided by a guide path 468' of the cam mechanism 458'. Upon pivoting movement of the engine 410' with respect to the aircraft component 442', i.e. when moving from the cruise position to the hover position or vice versa, the slotted cam rotates around the cam axis 466', while its orientation may remain substantially constant with respect to the aircraft component 442'.

Due to pivoting movement of the engine 410' and the rotation of the slotted cam around the cam axis 466', relative movement of the pin 470' at the first intermediate end 460a' of the first linkage means 456a' along a predefined path of the guide path 468' is initiated. This path is arranged such that the pin 470' moves according to the pivoting direction of the engine 410' and traverses a first, second and third angular range of the guide path 468'. With respect to a total angular range between the cruise position, which resembles a substantially parallel arrangement of the engine 410' in relation to the thrust direction TH, and the hover position, in which the engine 410 is substantially vertically aligned, the first angular range may be defined as 0° to 30°, the second angular range as 30° to 60° and the third angular range as 60° to 90°, wherein the third angular range may extend up to 120°.

In a closed position 438', which is depicted in FIGS. 4b and 4c, the distance of the guide path 468' to the cam axis 466' is shortest in the first angular range, whereas the corresponding distance gradually increases in the second angular range. Consequently, the pin 470' and the first linkage means 456a' are gradually pushed towards the rear of the engine 410', namely towards the jaw arrangement 432', while the pin 470' traverses the second angular range. In the third angular range, the distance from the guide path 468' to the cam axis 466' is greatest, such that the pin 470' is furthest away from the cam axis 466' while being in the third angular range.

In the second angular range of the guide path 468', when the distance of the pin 470' and the first linkage means 456a' to the cam axis 466' is gradually changing, the movement of the first linkage means 456a' translates into movement of the jaw 434b' at the first end 452', namely from the closed position 438' to an open position or vice versa. Therefore, the movement of the jaw 434b' is governed by the pivoting movement of the engine 410'. A link mechanism 480' is used to translate the movement of the jaw 434b' to jaw 434c', wherein the link mechanism 480' may be configured as described with respect to the third embodiment or as described with respect to the link mechanism 480 shown in FIG. 4a, including a slotted cam mechanism 484 and a pin 486. Further, the jaws 434' may be arranged such that they pivot around a jaw pivot axis 434a'. Alternatively to the jaw arrangement 432' shown in FIGS. 4b and 4c, jaw 434b' may be connected to the transmission 450' at the first end 452' at an offset distance 492 according to FIG. 4a.

According to the configuration of the variant of the fourth embodiment shown in FIGS. 4b and 4c, the jaw arrangement 432' remains in the closed position 438' during the first angular range, transfers from the closed position 438' to the open position in the second angular range and remains in the open positon in the third angular range. Vice versa, i.e. when the engine 410' pivots from the hover position to the cruise position, the jaw arrangement 432' remains in the open position during the third angular range, transfers to the closed position 438' during the second angular range and remains in the closed position 438' during the first angular range.

FIG. 5 shows a fifth embodiment of the variable area exhaust nozzle, which substantially corresponds to the third embodiment of FIGS. 3a and 3b. Therefore, in FIG. 5, analogous parts are provided with the same reference numerals as in FIGS. 3a and 3b, but increased by 200 (e.g. engine 510 analogous to engine 310). Further, the variable area exhaust nozzle 530 is only described in the following insofar as it differs from the variable area exhaust nozzle 330 of FIGS. 3a and 3b, and reference is made to the description of the third embodiment for all other features and functions.

A transmission 550 according to the fifth embodiment comprises an elastic member 561, for example a spring, connected at a first end 552 to a jaw 534 of a jaw arrangement 532 with an offset distance 592 to a jaw pivot axis 534a. At a second end 554, the elastic member 561 is connected to an aircraft component 542 (not shown, analogues to the aircraft component 342) with an offset distance 562 to an engine pivot axis 544.

For fixing the position of the jaw 534, a mechanical stop 594 is provided. When the engine pivots in an idle range, jaw 534 is held in abutment with the mechanical stop 594 by elastic member 561, while the elastic member 561 is compressed or expanded. Thus, when the engine 510 rotates around the engine pivot axis 544 within a first angular range, the transmission 550 transmits the movement of the engine 510 with respect to the aircraft component 542 to the jaw 534 such as to rotate the jaw 534. In contrast, when the engine 510 rotates around the engine pivot axis 544 within a second angular range (the idle range), the position of the jaw 534 with respect to the engine 510 is fixed.

The engine 510 may further comprise an elastic means 565 for pretensioning the jaw 534 towards an open position or towards a closed position 538. Said elastic means 565 is connected to at least one jaw 534 at a first end 565a. On a second end 565b, the elastic means 565, which may be an extension spring, is connected to an engine housing portion 512a.

For example, the elastic means 565 pretensions the jaw 534 in the closed position 538. The engine 510 may be swung downwardly from a cruise position in which the jaw 534 is in a closed position 538, to a hover position in which the jaw 534 is in an open position. First, the engine 510 performs a movement in the idle range, wherein the jaw 534 remains in the closed position 538. Afterwards, the engine is moved in the first range and the elastic means 565 is extended. Thus, the jaw 534 is opened in dependency of the movement of the engine 510, maximum until they reach the open position.

FIGS. 6*a* and 6*b* depict a sixth embodiment of the variable area exhaust nozzle, which substantially corresponds to the third embodiment of FIGS. 3*a* and 3*b*. Therefore, in FIGS. 6*a* and 6*b*, analogous parts are provided with the same reference numerals as in FIGS. 3*a* and 3*b*, but increased by 300 (e.g. engine 610 analogous to engine 610). Further, the variable area exhaust nozzle 630 is only described in the following insofar as it differs from the variable area exhaust nozzle 330 of FIGS. 3*a* and 3*b*, and reference is made to the description of the third embodiment for all other features and functions.

The sixth embodiment comprises a transmission 650, comprising a pulley transmission 667. Said pulley transmission 667 may have a first pulley 669, connected to a jaw pivot axis 634*a* of a jaw 634 of a jaw arrangement 632 and another second pulley 671 connected to an engine pivot axis 644 towards the engine 610 is movable. The first pulley 669 and the second pulley 671 may be connected with at least one connection means 673. Further, the second pulley 671 may have a non-circular cross section, preferably an oval cross section with a small-radius portion 671*c* and a large-radius portion 671*d*.

According to the sixth embodiment, the first pulley 669 and the second pulley 671 are connected with a belt arrangement 673, in particular a tensioning belt 673*a* and a loose belt 673*b*. The tensioning belt 673*a* and the loose belt 673*b* are fixed to each of the pulleys 669, 671, in particular to sides opposite to each other. For example, the loose belt 673*b* may be connected to the first pulley 669 at a right side 669*a* and to the second pulley 671 at a left side 671*b*, whereas the tensioning belt 673*a* is connected to the left side 669*b* of the first pulley and to a right side 671*a* of the second pulley 671. As a result, the tensioning belt 673*a* and the loose belt 673*b* cross each other at a crossover portion 675 between the first pulley 669 and the second pulley 671.

For maintaining a distance between the tensioning belt 673*a* and the loose belt 673*b* and accommodating a loose portion of the loose belt 673*b*, a belt tensioning device 679 may be provided in contact with the loose belt 673*b*.

In the cruise position according to FIG. 6*a*, the second pulley 671 is orientated with its small-radius portion 671*c* facing the first pulley 669. When the engine 610 is rotated with respect to an aircraft component 642 (not shown) around the engine pivot axis 644 towards hover position (FIG. 6*b*), the first pulley 669 swivels together with the engine around the engine pivot axis 644, whereas the second pulley 671 does not follow this rotation as it is fixed to the aircraft component. As a result, large-radius portion 671*d* of second pulley 671 is now facing the first pulley 669. As a consequence, the tensioning belt 673*a* is tensioned, the loose belt 673*b* is discharged and the first pulley 669 is rotated with respect to the engine. This leads to a movement of the jaws 634 from the closed position 638 into the open position 636.

As an alternative to the use of tensioning belt 673*a* and loose belt 673*b*, the above configuration may use one continuous belt surrounding and frictionally engaging both pulleys 669, 671. In a further modification of the embodiment, one continuous or two separate cables, chains or other longitudinal power transmission members may be used instead of the one or two belts.

The invention claimed is:

1. An engine of a vertical take-off and landing aircraft, wherein the engine is configured to be movable with respect, to an aircraft component of the aircraft between a hover position for take-off and landing, and a cruise position for forward flight, wherein the engine comprises a variable area exhaust nozzle mounted to an exhaust portion of the engine, said variable area exhaust nozzle comprising at least one aerodynamic element movable with respect to the engine between an open position and a closed position, wherein the engine comprises a transmission having a first end connected to the variable area exhaust nozzle and a second end adapted to be connected to the aircraft component, wherein the transmission is adapted to translate a movement of the engine with respect to the aircraft component into a movement of the at least one aerodynamic element, wherein the variable area exhaust nozzle comprises a first aerodynamic element and a second aerodynamic element, wherein the first and second aerodynamic elements are connected to one another by a link mechanism, such that movement of the first aerodynamic element drives movement of the second aerodynamic element.

2. The engine according to claim 1, wherein the transmission is configured to set the aerodynamic element to the open position when the engine assumes the hover position, and to set the aerodynamic element to the closed position when the engine assumes the cruise position.

3. The engine according to claim 1, wherein the aircraft component is an airfoil or a fuselage of the aircraft, or a component fixed to an airfoil or a fuselage of an aircraft.

4. The engine according to claim 1, wherein the range of movement of the engine with respect to the aircraft component between hover position and cruise position comprises a first range and a second range, wherein the transmission is configured such as to have a first transmission ratio when the engine moves within the first range, and to have a second transmission ratio lower than the first transmission ratio when the engine moves within the second range.

5. The engine according to claim 1, wherein the range of movement of the engine with respect to the aircraft component between hover position and cruise position comprises an idle range, wherein movement of the engine within the idle range is not transformed to a movement of the aerodynamic element.

6. The engine according to claim 5, wherein, in the idle range, the aerodynamic element or the transmission remains in abutment with a mechanical stop for fixing the position of the aerodynamic element with respect to the engine and/or wherein the transmission comprises an elastic member, which is arranged to accommodate movement of the engine with respect to the aircraft component within the idle range, such that the movement of the engine is not translated into a movement of the variable area exhaust nozzle.

7. The engine according to claim 1, wherein the transmission comprises linkage means, comprising a rod and/or a cam mechanism.

8. The engine according to claim 1, wherein the aerodynamic element is biased towards the first position or towards the second position by an elastic member.

9. The engine according to claim 1, wherein the transmission comprises a pulley transmission.

10. The engine according to claim 9, wherein the pulley transmission comprises at least a first pulley connected to the aerodynamic element, a second pulley adapted to be connected or to be fixed relative to the aircraft component, and a belt for transmitting movement of one of the pulleys to the other one of the pulleysF.

11. The engine according to claim 1, wherein the at least one aerodynamic element is a baffle plate or a jaw of the variable area exhaust nozzle adapted to deflect an exhaust air flow of the engine and define an exhaust area of the engine.

12. The engine according to claim 1, wherein the engine is an electric engine.

13. A vertical take-off and landing aircraft comprising an aircraft component and an engine according to claim 1.

14. The vertical take-off and landing aircraft of claim 13, comprising an airfoil and a plurality of engines mounted adjacent to one another to the airfoil such as to form a row.

15. The vertical take-off and landing aircraft of claim 13, wherein each of the engines is pivotable with respect to the airfoil independently from the other engines.

16. The vertical take-off and landing aircraft of claim 13, wherein the plurality of engines comprises more than 5 engines.

17. The vertical take-off and landing aircraft of claim 13, wherein the plurality of engines comprises more than 10 engines.

18. The vertical take-off and landing aircraft of claim 7, wherein the cam mechanism comprises a slotted cam.

19. The vertical take-off and landing aircraft of claim 10, wherein at least one of the pulleys has a non-circular cross section.

20. The vertical take-off and landing aircraft of claim 12, wherein the electric engine comprises an electric ducted fan.

* * * * *